US012083925B2

(12) United States Patent
Morita (10) Patent No.: US 12,083,925 B2
(45) Date of Patent: Sep. 10, 2024

(54) DRIVING CONTROL DEVICE AND DRIVING SYSTEM FOR VEHICLE (71) Applicant: DENSO CORPORATION, Kariya (JP)

(72) Inventor: Yoshinori Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 457 days.

(21) Appl. No.: 17/391,170

(22) Filed: Aug. 2, 2021

(65) Prior Publication Data
US 2021/0354588 A1 Nov. 18, 2021

Related U.S. Application Data (63) Continuation of application No. PCT/JP2020/003233, filed on Jan. 29, 2020.

(30) Foreign Application Priority Data

Feb. 8, 2019 (JP) .................................. 2019-022103

(51) Int. Cl.
B60L 15/20 (2006.01)
B60L 3/00 (2019.01)
B60L 58/15 (2019.01)
H01M 10/48 (2006.01)

(52) U.S. Cl.
CPC ............. B60L 58/15 (2019.02); B60L 3/0046 (2013.01); B60L 15/20 (2013.01); H01M 10/48 (2013.01); B60L 2240/547 (2013.01)

(58) Field of Classification Search
None
See application file for complete search history.

(56) References Cited

U.S. PATENT DOCUMENTS

| 9,329,239 | B2* | 5/2016 | Kunimitsu | ............... B60L 58/15 |
| 10,622,685 | B2* | 4/2020 | Yamamoto | .......... H01M 10/482 |
| 2017/0274775 | A1* | 9/2017 | Kamata | ............... H01M 10/486 |
| 2019/0160946 | A1* | 5/2019 | Yoshida | ................ B60L 3/0084 |
| 2019/0187221 | A1* | 6/2019 | Mukuno | .............. G01R 31/367 |
| 2022/0048391 | A1* | 2/2022 | Shiraishi | ................... H02J 7/00 |

FOREIGN PATENT DOCUMENTS

JP 2007-18871 A 1/2007

* cited by examiner

Primary Examiner — James M McPherson
(74) Attorney, Agent, or Firm — Oliff PLC (57) ABSTRACT In a driving control device that controls a driving system for a vehicle, a voltage detection unit acquires a voltage value for each of cells of the battery as a cell voltage value, an abnormality determination unit determines an abnormality in voltage detection system for each of the cells based on the cell voltage value, and a rank setting unit sets ranks of the plurality of cells based on a parameter involved in failure in the battery. A fail-safe running unit determines a mode of fail-safe running of the vehicle based on the rank of the cell to be detected by the voltage detection system determined to have an abnormality, and a rotating electric machine control unit controls the rotating electric machine based on the mode of fail-safe running of the vehicle determined by the fail-safe running unit.

11 Claims, 6 Drawing Sheets

DRIVING CONTROL DEVICE AND DRIVING SYSTEM FOR VEHICLE

CROSS-REFERENCE TO RELATED APPLICATION

This application is based on and claims the benefit of priority from earlier Japanese Patent Application No. 2019-022103 filed Feb. 8, 2019, the description of which is incorporated herein by reference.

BACKGROUND

Technical Field

The present disclosure relates to a driving control device that controls a driving system for a vehicle, which includes a rotating electric machine capable of driving the vehicle by power supplied from a battery.

Related Art

A driving system including, as a battery, a secondary battery that includes a plurality of cells, is known, in which power is supplied to a rotating electric machine from the battery and the rotating electric machine is used to drive a vehicle. In this driving system, when a voltage detection circuit that detects a voltage of the battery for each cell can not detect a cell voltage normally, due to disconnection, circuit failure or the like, charging of the battery is prohibited or provided. This prevents overcharging of the battery.

DESCRIPTION OF SPECIFIC EMBODIMENTS

When the voltage detection circuit that detects the voltage of the battery breaks down while the vehicle is running, it is preferable to run the vehicle fail-safely while quickly decelerating the vehicle, and to stop the vehicle at a safe place. In the above known driving system, as disclosed in JP-A-2007-18871, charging of the battery is immediately prohibited even when the cell voltage can not be detected normally for some of the cells. Therefore, fail-safe running is performed in a state where charging of the battery is prohibited. However, even when there is an abnormality in the cell voltage detection system in some of the cells, it may be possible to maintain a state where the battery is not overcharged without prohibiting charging of the battery.

In view of the foregoing, it is desired to have a technique capable of ensuring the fail-safe running performance of a vehicle while avoiding failure in a battery including a plurality of cells when an abnormality occurs in voltage detection system for each of the cells in the battery.

One aspect of the present disclosure provides a driving control device for controlling a driving system for a vehicle, the driving system including: a battery as an assembled battery having a plurality of cells; and a rotating electric machine that drives the vehicle by power supplied. The driving control device includes: a battery control unit that control the battery; a rotating electric machine control unit that controls the rotating electric machine; and a fail-safe running unit that controls fail-safe running of the vehicle. The battery control unit includes: a voltage detection unit that acquires a voltage value for each of the cells of the battery as a cell voltage value; an abnormality determination unit that determines an abnormality in voltage detection system for each of the cells based on the cell voltage value; and a rank setting unit that sets ranks of the plurality of cells based on a parameter involved in failure in the battery. The fail-safe running unit determines a mode of fail-safe running of the vehicle based on the rank of the cell to be detected by the voltage detection system determined to have an abnormality. The rotating electric machine control unit controls the rotating electric machine based on the mode of fail-safe running of the vehicle determined by the fail-safe running unit.

According to the aspect of the present disclosure, during fail-safe running of the vehicle, the rotating electric machine is controlled based on the mode of fail-safe running determined by the fail-safe running unit. The mode of fail-safe running is determined based on the rank of the cell to be detected by the voltage detection system determined to have an abnormality by the abnormality determination unit, among the plurality of cells of the battery and the voltage detection system for each of the cells. The cell rank is set for each of the cells by the rank setting unit based on the parameter involved in a failure in the battery. Therefore, the mode of fail-safe running can be determined in consideration of the failure in the battery, based on the rank of the cell to be detected by the voltage detection system determined to have an abnormality. As a result, when an abnormality occurs in the voltage detection system for each of the cells, it is possible to ensure the fail-safe running performance of the vehicle while avoiding a failure in the battery such as overcharge.

First Embodiment

Figure 1:
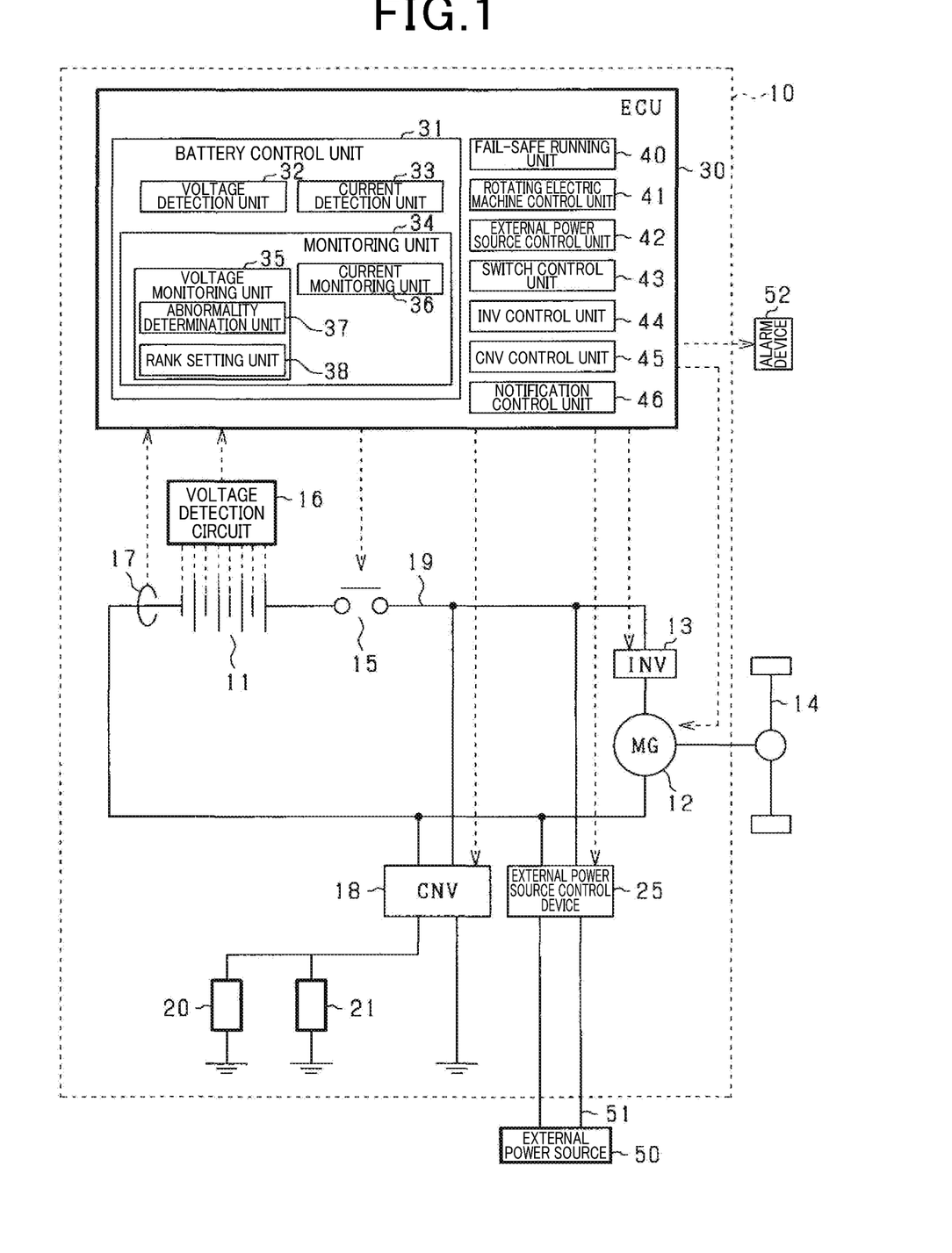
FIG. 1 is a diagram showing a driving system for a vehicle according to a first embodiment.

FIG. 1 shows a driving system 10 for a vehicle according to the present embodiment. The driving system 10 is mounted on a vehicle that is an electric vehicle (EV vehicle) and can drive wheels 14 of the vehicle. The driving system 10 includes a battery 11, a rotating electric machine 12 that is a high-voltage load, an inverter 13, a switch 15, a voltage detection circuit 16, a current detection device 17, a converter 18, an external power source control device 25, low-voltage loads 20 and 21, and an electronic control unit (ECU) 30.

The battery 11 is a secondary battery, and, more specifically, for example, a lithium ion storage battery having an output voltage of about 200 to 300 V. In the present embodiment, the battery 11 is an assembled battery including a series connection body of a plurality of cells (single cells). In each embodiment presented herein, the case where the battery 11 is composed of a plurality of cells that are equal to each other in terms of the rated voltage and the battery capacity when fully charged will be illustrated and described.

The rotating electric machine 12 converts the rotational energy of the wheels 14 into power when operating as a generator, and converts the power supplied from the battery 11 into rotational energy when operating as an electric motor. The rotating electric machine 12 is sometimes referred to as a motor generator (MG).

The inverter 13 is connected between the switch 15 and the rotating electric machine 12 on wiring 19 that connects the battery 11 and the rotating electric machine 12. When the rotating electric machine 12 operates as a generator, the inverter 13 can convert the generated AC power into DC power and store the DC power in the battery 11. When the rotating electric machine 12 operates as an electric motor, the inverter 13 can convert the DC power output from the battery 11 into AC power to operate the rotating electric machine 12.

The switch 15 is installed on the wiring 19 that connects the battery 11 and the rotating electric machine 12. By switching the switch 15, the connection/disconnection of the wiring 19 can be switched. When the switch 15 is in a connection state, the battery 11 and the rotating electric machine 12 are electrically connected. When the switch 15 is in a cutoff state, the battery 11 and the rotating electric machine 12 are not electrically connected.

The voltage detection circuit 16 is a voltage detection circuit connected to each cell of the battery 11 which is a secondary battery, and can detect a voltage value of each cell. The current detection device 17 can detect charge/discharge current of the battery 11.

The converter 18 is a DC-DC converter. The converter 18 is connected between the battery 11 and the switch 15 and the rotating electric machine 12 and the inverter 13, and is connected to the low-voltage loads 20 and 21. The converter 18 is connected between a high-voltage side (side of the battery 11 and the inverter 13) and a low-voltage side (side of the low voltage loads 20 and 21). The converter 18 steps down the power input from the high-voltage side and outputs the power to the low-voltage side. Further, the converter 18 boosts the power input from the low-voltage side and outputs the power to the high-voltage side.

The low-voltage loads 20 and 21 are auxiliary machines that are operated by relatively low-voltage power supplied from the converter 18, and are composed of instruments that operate at a relatively low voltage of about 12 V.

The external power source control device 25 is a device that controls delivery of power between the battery 11 and an external power source 50 of the vehicle. The external power source 50 is, for example, a charger installed in a charge stand or the like, and is connected to the vehicle with a charge cable, and thus can charge the battery 11 from the external power source 50. The external power source control device 25 is connected between the battery 11 and the switch 15 and the rotating electric machine 12 and the inverter 13, and is also connected to a power cable 51 that connects the external power source 50.

An alarm device 52 is a device for providing a notification to a driver and the like, and is mounted on the vehicle. Examples of the alarm device 52 include, but are not limited to, auditory notification devices, such as a speaker and a buzzer, installed in the vehicle compartment. The alarm device 52 issues an alarm sound, a voice, or the like based on a control command from the ECU 30 to notify the driver, for example, that an abnormality has occurred in the voltage detection system of the battery 11.

The ECU 30 is a driving control device that controls each of the components of the driving system 10 such as the battery 11, the rotating electric machine 12, the inverter 13, the converter 18, and the external power source control device 25. The ECU 30 includes a battery control unit 31 that controls the battery 11, a fail-safe running unit 40 that controls fail-safe running of the vehicle, a rotating electric machine control unit 41 that controls the rotating electric machine 12, an external power source control unit 42 that controls the external power source control device 25, a switch control unit 43 that controls the switch 15, an inverter control unit 44 that controls the inverter 13, a converter control unit 45 that controls the converter 18, and a notification control unit 46 that controls the notification device. The ECU 30 is mainly composed of a microcomputer including a CPU, a ROM, a RAM, a backup RAM, I/O, and the like (none of which is shown), and executes various control programs stored in the ROM, so that the functions of the respective control units described herein can be realized.

The battery control unit 31 can perform processing of controlling the charge/discharge power of the battery 11. The battery control unit 31 includes a monitoring unit 34, a voltage detection unit 32, and a current detection unit 33. The monitoring unit 34 includes a voltage monitoring unit 35 and a current monitoring unit 36. The voltage monitoring unit 35 includes an abnormality determination unit 37 and a rank setting unit 38.

The voltage detection unit 32 acquires a voltage value for each cell of the battery 11 detected by the voltage detection circuit 16 as a battery voltage value VC. The current detection unit 33 acquires a charge/discharge current value of the battery 11 detected by the current detection device 17 as a battery current value IB.

The voltage monitoring unit 35 monitors a cell voltage value VC, and the abnormality determination unit 37 determines an abnormality in the voltage detection system of the battery 11 for each cell based on the cell voltage value VC. The voltage detection system means each configuration related to the detection of the cell voltage value VC, and includes the voltage detection circuit 16, the voltage detection unit 32, and wiring between the voltage detection circuit 16 and each cell of the battery 11. The abnormality in voltage detection system means a state in which the voltage of each cell of the battery 11 can not be detected normally, due to a failure in the detection circuit in the voltage detection circuit 16, a disconnection of the wiring between the voltage detection circuit 16 and each cell of the battery 11, a communication abnormality between the ECU 30 and the voltage detection circuit 16, and the like.

The rank setting unit 38 sets a rank of each of the plurality of cells based on a parameter involved in failure in the battery 11. Examples of the failure in the battery 11 include overcharge and overdischarging of the battery 11. As the parameter involved in the failure in the battery 11, for example, the voltage, state of charge (SOC), internal resistance, and the like of each cell can be exemplified.

The rank setting unit 38 may be configured to set the ranks of the cells so that the cell rank corresponds to the magnitude of the parameter itself involved in failure in the battery 11. Alternatively, the rank setting unit 38 may be configured to set the ranks of the cells so that the cell rank corresponds to a degree of contribution in the occurrence of the failure in the battery 11 to be prevented or suppressed.

Specifically, for example, the cell rank may be set so that a higher rank is given to a cell having a higher cell voltage value VC, based on the cell voltage value VC acquired in each of the cells, in a state where the cell to be detected by the voltage detection system determined to have an abnormality by the abnormality determination unit 37 is excluded. When the cell rank is set in this way, a cell higher in rank has a larger amount of charge. Therefore, if there is an abnormality in the voltage detection system that should detect the cell, overcharge is more likely to occur. A cell lower in rank has a smaller amount of charge. Therefore, if there is an abnormality in the voltage detection system that should detect the cell, overdischarge is more likely to occur.

Further, the rank setting unit 38 may set the ranks of the cells so that a higher rank is given to a cell having a higher state of charge (SOC), based on, for example, the state of charge of each cell. Alternatively, the ranks of the cells may be set so that a higher rank is given to a cell having a lower internal resistance, based on, for example, the internal resistance of each cell. When the cell rank is set in this way, overcharge is more likely to occur in a cell higher in rank, if there is an abnormality in the voltage detection system that should detect the cell. Also, overdischarge is more likely to occur in a cell lower in rank, if there is an abnormality in the voltage detection system that should detect the cell.

The rank setting unit 38 may be configured to set the rank of each cell based on a plurality of the parameters involved in failure in the battery 11. For example, points may be given for the voltage, capacity, and internal resistance of each cell, and the ranks of the cells may be set based on a total sum of the points. More specifically, for each cell, a point (voltage) which is higher for a higher voltage: PV, a point (capacity) which is higher for a higher capacity: PC, and a point (internal resistance) which is higher for a lower internal resistance: PR are calculated. Further, for each cell, the total sum: PS=PV+PC+PR is calculated. Further, the ranks of the cells are set so that a higher rank is given to a cell having a higher total sum PS. When the cell rank is set in this way, overcharge is more likely to occur in a cell higher in rank, if there is an abnormality in the voltage detection system that should detect the cell. Also, overdischarge is more likely to occur in a cell lower in rank, if there is an abnormality in the voltage detection system that should detect the cell.

The determination as to the abnormality in the voltage detection system by the abnormality determination unit 37 and the setting of the cell rank by the order setting unit 38 may be performed for all the cells constituting the battery 11, or may be set for some of the cells, which are set as cells to be monitored. Further, the cells to be monitored may be cells except the cell to be detected by the voltage detection system determined to have an abnormality by the abnormality determination unit 37.

The voltage monitoring unit 36 monitors the battery current value IB. The current monitoring unit 36 determines that the battery 11 is charged when the battery current value IB is on a charge side relative to a predetermined current threshold value. The current monitoring unit 36 only has to be configured to monitor the battery current value IB at least when the charging of the battery 11 is prohibited, or may be configured to monitor the battery current value IB even when the charging of the battery 11 is not prohibited.

When the abnormality determination unit 37 determines that there is an abnormality in the voltage detection system of at least one of the cells to be monitored, the fail-safe running unit 40 determines a mode of fail-safe running of the vehicle based on the rank of the cell to be detected by the voltage detection system determined to have an abnormality. The fail-safe running unit 40 may be configured to output, to the rotating electric machine control unit 41 or the like, a command to control the rotating electric machine 12 or the like based on the determined mode of fail-safe running.

The mode of fail-safe running is preferably a mode for suppressing or preventing a failure in the battery 11 (overcharge or overdischarge), or a mode for providing a notification of a failure in the battery 11.

More specifically, examples of the mode for preventing overcharging of the battery 11 (overcharge prevention mode) can include a mode including prohibiting charging of the battery 11 from the rotating electric machine 12 or the external power source 50, and a mode including prohibiting power generation of the rotating electric machine 12. The specific examples of the overcharge prevention mode exemplified herein may be used in combination.

Further, the mode for preventing overdischarging of the battery 11 (overdischarge prevention mode) can include a mode for making a lower limit of the state of charge that allows the battery 11 to be discharged higher than that during non-fail-safe running (for example, normal running) of the vehicle, and a mode for making a driving force of the rotating electric machine 12 to drive the vehicle lower than that during the non-fail-safe running of the vehicle. The specific examples of the overdischarge prevention mode exemplified herein may be used in combination.

The fail-safe running unit 40 may determine whether the rank of the cell to be detected by the voltage detection system determined to have an abnormality is higher or lower than a predetermined threshold value set in consideration of the risk of a failure in the battery 11, and may determine the mode of fail-safe running based on the determination result. As used herein, the terms "higher in rank than . . . " and "lower in rank than . . . " may include the same rank.

For example, in a case where the rank setting unit 38 sets the cell rank so that a higher rank is given to a cell having a higher cell voltage value VC when it is determined by the abnormality determination unit 37 that there is no abnormality in voltage detection system, the fail-safe running unit 40 is preferably configured to determine the overcharge prevention mode as the mode of fail-safe running, when the rank of the cell is higher than a predetermined high-order threshold value XH. Further, the fail-safe running unit 40 is preferably configured to determine the overdischarge prevention mode as the mode of fail-safe running, when the rank of the cell is lower than a predetermined low-order threshold value XL.

For example, in a case where the rank setting unit 38 sets the cell rank so that a higher rank is given to a cell having a higher state of charge, or that a higher rank is given to a cell having a lower internal resistance, the fail-safe running unit 40 is preferably configured to determine the overcharge prevention mode as the mode of fail-safe running, when the rank of the cell is higher than the predetermined high-order threshold value. Further, the fail-safe running unit 40 is preferably configured to determine the overdischarge prevention mode as the mode of fail-safe running, when the rank of the cell is lower than the predetermined low-order threshold value.

In the above, the high-order threshold value has a relatively high rank set in consideration of the risk of overcharge in the battery 11. The low-order threshold value has a relatively low rank set in consideration of the risk of overdischarge in the battery 11. The high-order threshold value is set to be higher in rank than the low-order threshold value.

The mode for providing a notification of a failure in the battery 11 may be always selected regardless of the rank of the cell to be detected by the voltage detection system determined to have an abnormality.

The rotating electric machine control unit 41 can control the rotating electric machine 12 to control its power running operation and regenerative operation. The rotating electric machine control unit 41 controls a running state of the vehicle, when performing the power running operation of the rotating electric machine 12, and controls an amount of power generated by the rotating electric machine 12, when regeneratively operating the rotating electric machine 12, and thus can control the amount of charge of the battery 11.

When the abnormality determination unit 37 determines that there is an abnormality in the voltage detection system for at least one of the cells to be monitored, the rotating electric machine control unit 41 controls the rotating electric machine 12 according to the mode of fail-safe running determined by the fail-safe running unit 40. As a result, the vehicle can be brought in a fail-safe running state.

The rotating electric machine control unit 41 perform a control to prohibit power generation of the rotating electric machine 12, for example. This can prevent overcharging of the battery 11. Also, the rotating electric machine control unit 41 controls the driving force of the rotating electric machine 12 that drives the vehicle to be lower than that during non-fail-safe running of the vehicle. This can prevent overdischarging of the battery 11.

By controlling the external power source control device 25, the external power source control unit 42 can control the charging of the battery 11. The external power source control unit 42 may also be able to control the external power source control device 25 to control the discharge from the battery 11 to the external power source 50.

When the abnormality determination unit 37 determines that there is an abnormality in the voltage detection system for at least one of the cells to be monitored, the external power source control unit 42 controls the amount of charge/discharge of the external power source 50 according to the mode of fail-safe running determined by the fail-safe running unit 40. The external power source control unit 42 can prevent overcharging of the battery 11, for example, by performing a control to prohibit charging of the battery 11 from the external power source 50.

The switch control unit 43 cuts off the switch 15 based on the determination result of the current monitoring unit 36 when the charging of the battery 11 from the rotating electric machine 12 and the external power source 50 is prohibited. That is, when the current monitoring unit 36 determines that the battery 11 is charged, the switch 15 is cut off. Thus, the switch 15 can be cut off when the battery 11 is erroneously charged, despite the fact that the charging of the battery 11 is prohibited. By cutting off the switch 15, power distribution in the wiring 19 is cut off, and the charge current to the battery 11 is cut off. When the switch 15 is cut off, the discharge current from the battery 11 is also cut off.

The inverter control unit 44 can control the inverter 13 to convert the AC power generated by the rotating electric machine 12 into DC power. Further, the inverter 13 can convert the DC power output from the battery 11 into AC power.

By controlling the converter 18, the converter control unit 45 can control the delivery of power between the battery 11 and the low-voltage loads 20 and 21. The converter control unit 45 may be configured to increase the operating time of the converter 18 to increase the power consumption, during fail-safe running. Further, when increasing the power consumption of the converter 18, the converter control unit 45 may be configured to increase the power consumption of the low-voltage loads 20 and 21 as compared with a normal time.

The notification control unit 46 controls the alarm device 52 or the like to perform notification. When the mode of fail-safe running determined by the fail-safe running unit 40 includes the mode of providing a notification of a failure in the battery 11, the notification control unit 46 performs notification by means of the alarm device 52 or the like.

Figure 2:
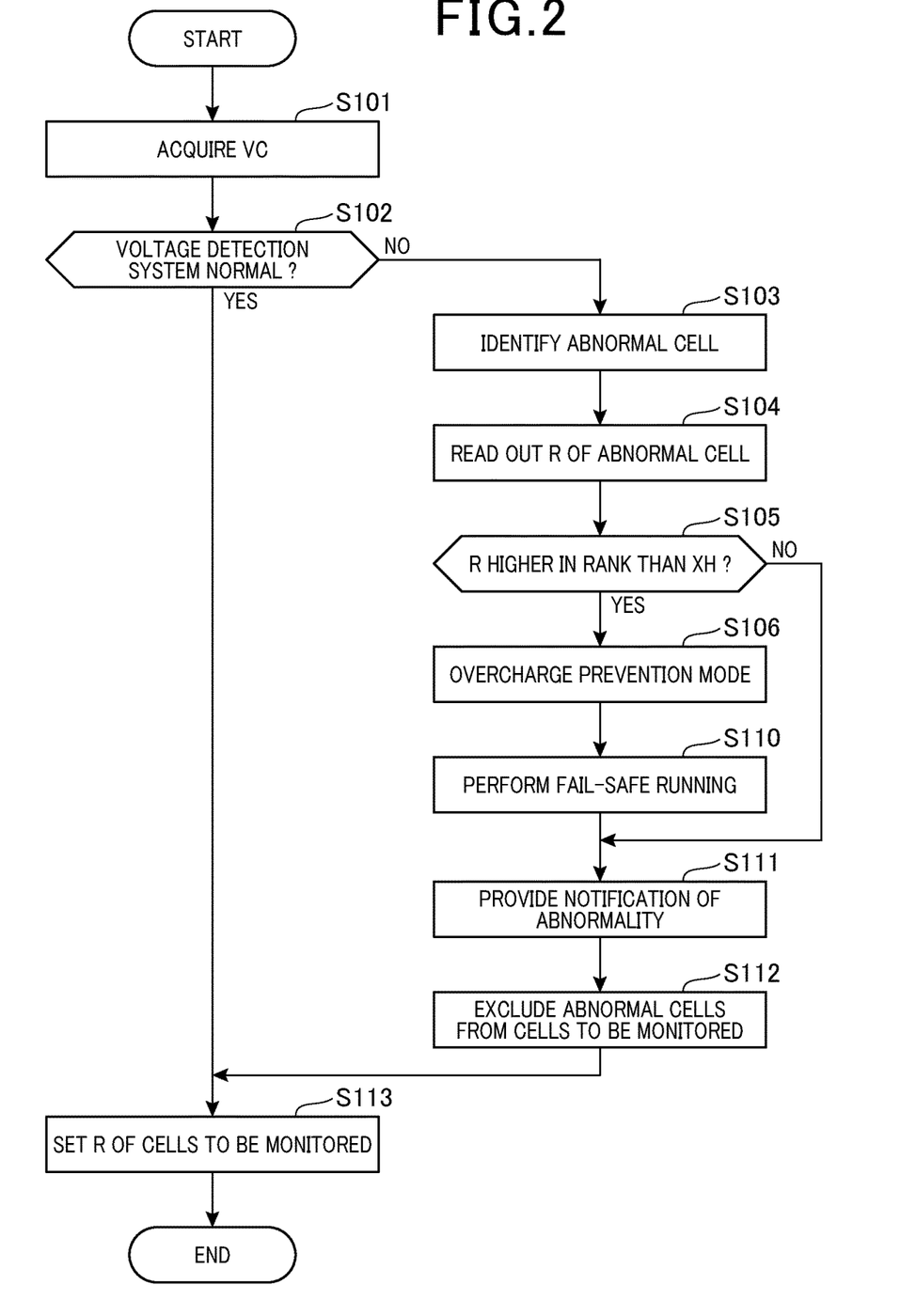
FIG. 2 is a flowchart of vehicle driving control according to the first embodiment.

FIG. 2 shows a flowchart of vehicle driving control performed by the ECU 30. The processing related to this flowchart is repeatedly performed at a predetermined cycle.

In step S101, for the cells to be monitored among the plurality of cells constituting the battery 11, the cell voltage value VC is acquired for each cell. For example, when ten cells in the battery 11 are to be monitored, identification numbers 1 to 10 are assigned to the ten cells. The identification number and the cell voltage value VC are associated with each other and stored in the ECU 30. Then, the process proceeds to step S102.

In step S102, it is determined, for each cell, whether the voltage detection system is normal or abnormal based on the acquired cell voltage value VC. Specifically, when the acquired cell voltage value VC is as small as near zero or when the acquired cell voltage value VC is large beyond the voltage detection range, it is determined that the voltage detection system that should detect the cell is abnormal (not normal). For example, it is determined whether the voltage detection system is normal or abnormal for each of the cell voltage values VC associated with the cells numbered 1 to 10 to be monitored. The determination results are stored in the ECU 30 in association with the identification numbers. When it is determined that the voltage detection system is normal for all the cells, the process ends. When it is determined that the voltage detection system is abnormal for at least some of the cells, the process proceeds to step S103.

In step S103, the cell determined to have an abnormality in the voltage detection system is identified. For example, when the identification number of the cell to be detected by the voltage detection system determined to have an abnormality is No. 1, the cell with identification number 1 is identified as an abnormality cell. Then, the process proceeds to step S104.

In step S104, ranks R of the cells to be monitored are read from the ECU 30. The ranks of the cells are set so that a higher rank is given to a cell having a higher cell voltage value VC acquired in a state where there is no abnormality in the voltage detection system, and are stored in the ECU 30. Specifically, the ranks are set as rank 1, rank 2, . . . , rank 10 from the highest rank side. For example, the ECU 30 stores each of the ranks of the cells numbered 1 to 10 to be monitored, and the rank R of the cell with identification number 1, which is identified as an abnormal cell, is read out. Then, the process proceeds to step S105.

In step S105, it is determined whether the rank R read out is higher than the predetermined high-order threshold value XH. The high-order threshold value XH is set at a relatively high rank, and is set in consideration of the risk of overcharge. For example, in a case where the high-order threshold value XH has rank 3, it is determined that the rank R is higher than the predetermined high-order threshold value XH, when the rank R (rank of abnormal cell) read out is any of ranks 1 to 3. When an affirmative determination is made in step S105, the process proceeds to step S106. When a negative determination is made, the process proceeds to step S111.

In step S106, it is determined that the overcharge prevention mode is selected as the mode of fail-safe running. In step S106, a specific mode of the overcharge prevention mode is determined. For example, it is determined that power generation in the rotating electric machine 12 is prohibited and that charging of the battery 11 from the external power source 50 is prohibited. Then, the process proceeds to step S110.

In step S110, fail-safe running is performed based on the overcharge prevention mode determined in step S106. Thus, the control to prohibit power generation is performed on the rotating electric machine 12, and the control to prohibit charging of the battery 11 from the external power source 50 is performed on the external power source control device 25. Then, the process proceeds to step S111.

In step S111, the alarm device 52 notifies the driver and the like about the abnormality. For example, the alarm device 52 is controlled to generate an alarm sound notifying the driver about the failure in the battery 11. Then, the process proceeds to step S112.

In step S112, the cell to be detected by the voltage detection system determined to have an abnormality in step S102 is excluded from the cells to be monitored. For example, the cell with the identification number 1, which is identified as an abnormal cell, is excluded from the cells to be monitored. As a result, the cells to be monitored are cells with identification numbers 2 to 10. Then, the process proceeds to step S113.

In step S113, the ranks of the cells to be monitored are set based on the cell voltage values VC acquired in step S101. The set ranks of the cells are stored in the ECU 30. Thereafter, the process ends.

As described above, according to the ECU 30, when it is determined through the processing in steps S101 to S104 that there is an abnormality in the voltage detection system for each cell, the cell (abnormal cell) to be detected by the voltage detection system is identified, and the rank of the abnormal cell can be read out. The processing in steps S105 and S106 makes it possible to determine whether to select the overcharge prevention mode based on the comparison between the rank of the abnormal cell and the high-order threshold value XH. In a case where an abnormal cell exists, it is determined whether it is necessary to prevent overcharge based on the rank of the abnormal cell without immediately performing the overcharge prevention control such as power generation prohibition in the rotating electric machine 12, and, only when it is determined that it is necessary to prevent overcharge, the overcharge prevention control is performed. When it is determined that it is not necessary to prevent overcharge, the alarm device 52 provides a notification of the abnormality, but the overcharge prevention control is not performed. As a result, it is possible to ensure the fail-safe running performance of the vehicle while avoiding a failure in the battery 11 due to overcharge.

Further, since the abnormal cell is excluded from the cells to be monitored in step S112, the ranks of the cells can be set based on the cell voltage values VC acquired in a state where there is no abnormality in the voltage detection system and stored in the ECU 30, in step S113. By periodically performing the series of processing shown in FIG. 2, even when an abnormality in the voltage detection system is determined for some cells of the battery 11, the remaining cells in which the voltage detection system is normal can continuously perform fail-safe running.

Second Embodiment

Figure 3:
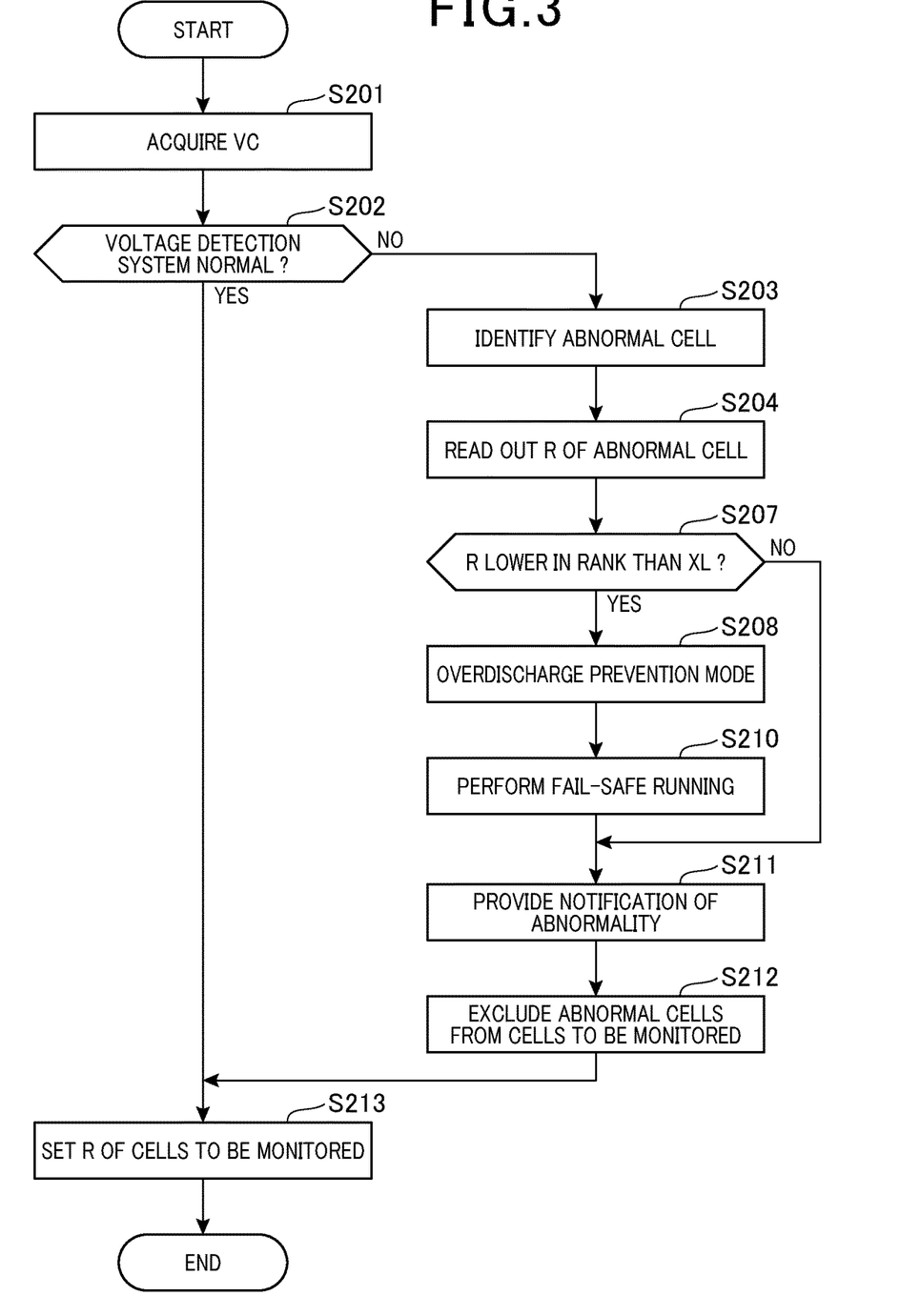
FIG. 3 is a flowchart of vehicle driving control according to a second embodiment.

FIG. 3 is a flowchart of vehicle driving control according to a second embodiment. The processing related to this flowchart is repeatedly performed at a predetermined cycle. FIG. 3 differs from FIG. 2 in the processing shown in step S207 and S208. Since the processing in steps S201 to S204 and S210 to S213 is the same as that in steps S101 to S104 and S110 to S113 shown in FIG. 2, the description thereof will be omitted.

In step S207, it is determined whether the rank R read out is lower than the low-order threshold value XL. The low-order threshold value XL is set at a relatively low rank, and is set in consideration of the risk of overdischarge. For example, in a case where the low-order threshold value XL has rank 8, it is determined that the rank R is lower than the predetermined low-order threshold value XL, when the rank R (rank of abnormal cell) read out is any of ranks 8 to 10. When an affirmative determination is made in step S207, the process proceeds to step S208. When a negative determination is made, the process proceeds to step S211.

In step S208, it is determined that the overdischarge prevention mode is selected as the mode of fail-safe running. In step S208, a specific mode of the overdischarge prevention mode is determined. Also, it is determined that the driving force of the rotating electric machine 12 to drive the vehicle is made lower than that during non-fail-safe running of the vehicle. Then, the process proceeds to step S210.

In step S210, fail-safe running is performed based on the overdischarge prevention mode determined in step S208. Thus, for the rotating electric machine 12, control is performed to make the driving force for driving the vehicle, i.e., the driving force during power running operation, lower than that during non-fail-safe running of the vehicle. Then, the process proceeds to step S211.

As described above, according to the second embodiment, the processing in steps S207 and S208 makes it possible to determine whether to select the overdischarge prevention mode based on the comparison between the rank of the abnormal cell and the low-order threshold value XL. In a case where an abnormal cell exists, it is determined whether it is necessary to prevent overdischarge based on the rank of the cell without immediately performing the overdischarge prevention control such as reduction in driving force during power running operation in the rotating electric machine 12, and, only when it is determined that it is necessary to prevent overdischarge, the overdischarge prevention control is performed. When it is determined that it is not necessary to prevent overdischarge, the alarm device 52 provides a notification of the abnormality, but the overdischarge prevention control is not performed. As a result, it is possible to ensure the fail-safe running performance of the vehicle while avoiding a failure in the battery 11 due to overdischarge.

Third Embodiment

Figure 4:
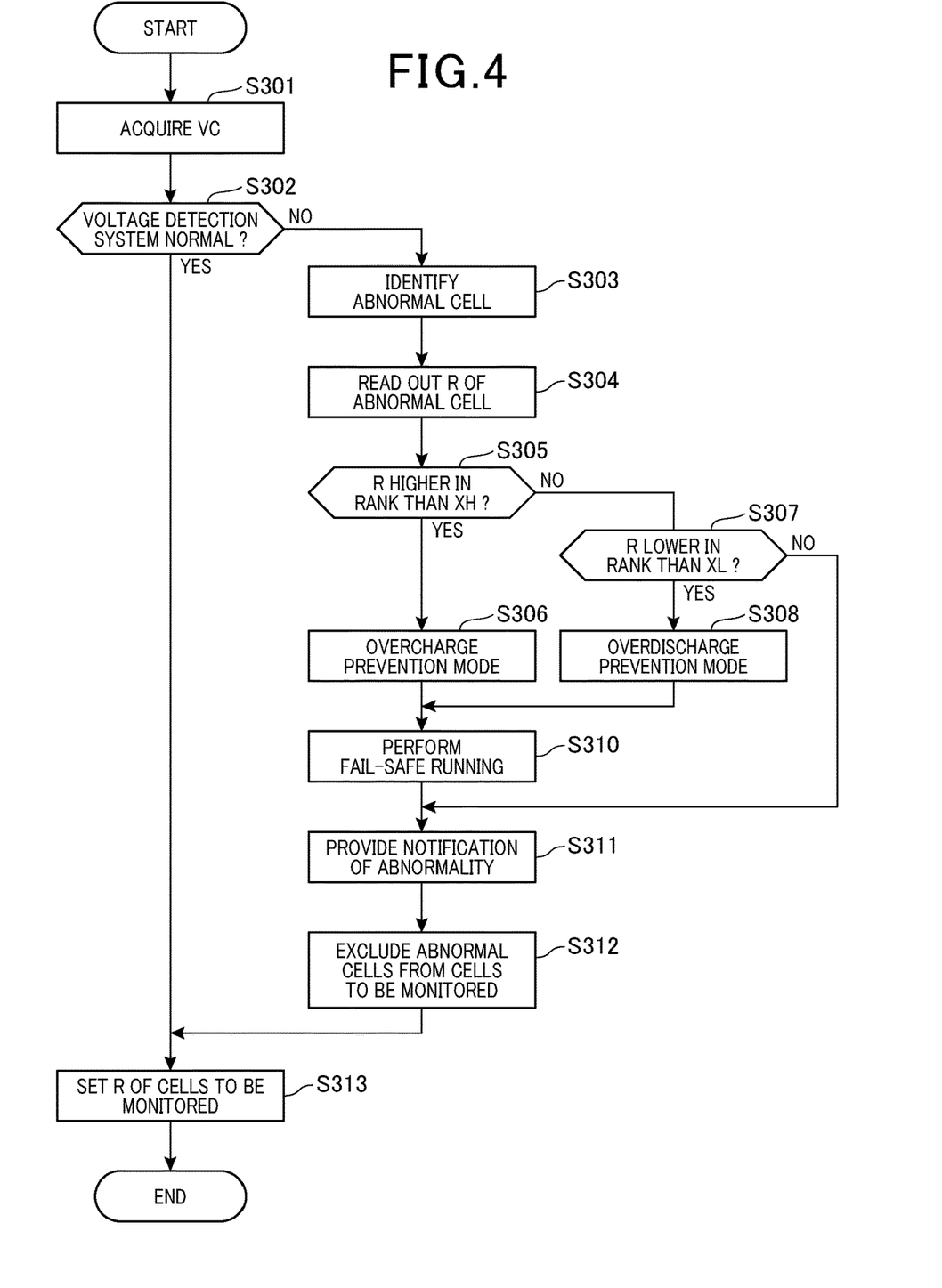
FIG. 4 is a flowchart of vehicle driving control according to a third embodiment.

FIG. 4 is a flowchart of vehicle driving control according to a third embodiment. The processing related to this flowchart is repeatedly performed at a predetermined cycle. FIG. 3 differs from FIG. 2 in the processing shown in step S305 and S308. Since the processing in steps S301 to S304 and S310 to S313 is the same as that in steps S101 to S104 and S110 to S113 shown in FIG. 2, the description thereof will be omitted.

In step S305, it is determined whether the rank R read out is higher than the predetermined high-order threshold value XH, similarly as in step S105. When an affirmative determination is made in step S305, the process proceeds to step S306, and, similarly as in step S106, it is determined that the overcharge prevention mode is selected as the mode of the fail-safe running, and then the process proceeds to step S310. When a negative determination is made, the process proceeds to step S307.

In step S307, it is determined whether the rank R read out is lower than the predetermined low-order threshold value XL, similarly as in step S207. When an affirmative determination is made in step S307, the process proceeds to step S308, and it is determined that the overdischarge prevention mode is selected as the mode of the fail-safe running, and then the process proceeds to step S310. When a negative determination is made, the process proceeds to step S311.

In step S310, fail-safe running is performed based on the overcharge prevention mode determined in step S106 or the overdischarge prevention mode determined in step S308. Then, the process proceeds to step S311.

As described above, according to the third embodiment, the processing in steps S305 and S306 makes it possible to determine whether to select the overcharge prevention mode based on the comparison between the rank of the abnormal cell and the high-order threshold value XH. The processing in steps S307 and S308 makes it possible to determine whether to select the overdischarge prevention mode based on the comparison between the rank of the abnormal cell and the high-order threshold value XL. In a case where an abnormal cell exists, it is determined whether it is necessary to prevent overcharge or overdischarge based on the rank of the cell without immediately performing the overcharge or overdischarge prevention control, and, only when it is determined that it is necessary to prevent overcharge or overdischarge, the required control is performed. When it is determined that it is not necessary to prevent either overcharge or overdischarge, the alarm device 52 provides a notification of the abnormality, but the overcharge or overdischarge prevention control is not performed. As a result, it is possible to ensure the fail-safe running performance of the vehicle while avoiding a failure in the battery 11 due to overcharge and overdischarge.

Other Embodiments

In the above, the driving system 10 for an EV vehicle shown in FIG. 1 has been illustrated and described, but the present disclosure is not limited thereto. The technique related to the driving system and the driving control device described above can also be applied to a hybrid vehicle (HV vehicle).

Figure 5:
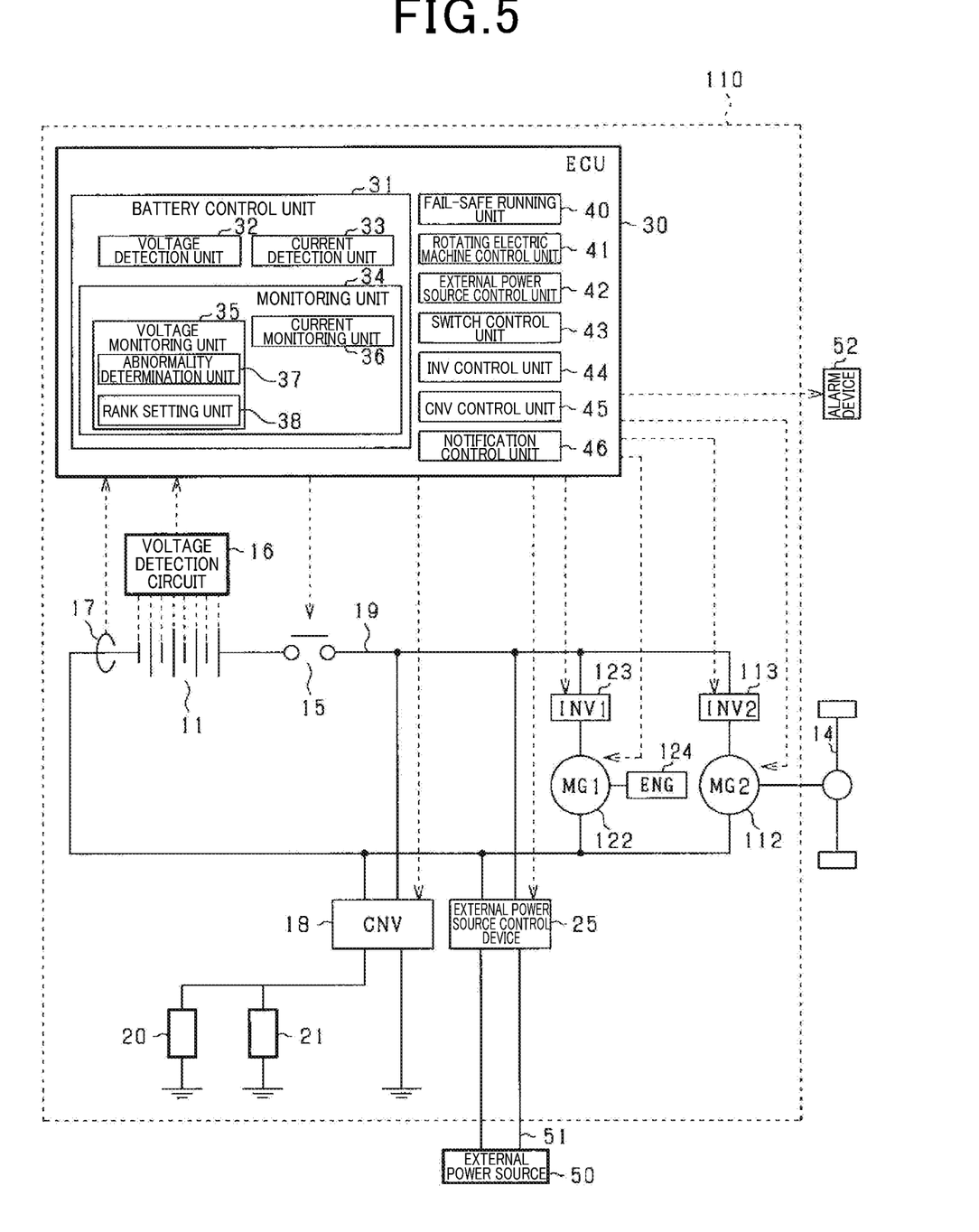
FIG. 5 is a diagram showing a driving system for a vehicle according to another embodiment.

A driving system 110 shown in FIG. 5 differs from that shown in FIG. 1 in that, in addition to the rotating electric machine 112 for driving the vehicle and the inverter 113 which are the same as those of the driving system 10 shown in FIG. 1, the driving system 110 further includes a rotating electric machine 122, an inverter 123, and an internal combustion engine 124. Since other configurations are substantially the same as those of the driving system 10, the description thereof will be omitted.

The vehicle runs by supplying power to the rotating electric machine 112 and driving the wheels 14. By driving the engine 124, the rotating electric machine 122 can be regeneratively operated to obtain generated power. The generated power of the rotating electric machine 122 is supplied to the battery 11, the rotating electric machine 122, and the like via the inverter 123. The power charged in the battery 11 or the power generated by the rotating electric machine 122 can be used to drive the rotating electric machine 122 and to run the vehicle.

In a system including a plurality of rotating electric machines 112 and 122, like the driving system 110, controlling the plurality of rotating electric machines 112 and 122 in such a manner that a sum W1 of generated power, which is a total sum of the power generated by the plurality of rotating electric machines 112 and 122, does not exceed a sum W2 of consumed power, which is a total sum of the power consumed by the plurality of rotating electric machines 112 and 122, may be included as the overcharge prevention mode. Specifically, for example, the overcharge prevention mode shown in step S106 of FIG. 2 and step S306 of FIG. 4 may include the control as shown in FIG. 6.

Figure 6:
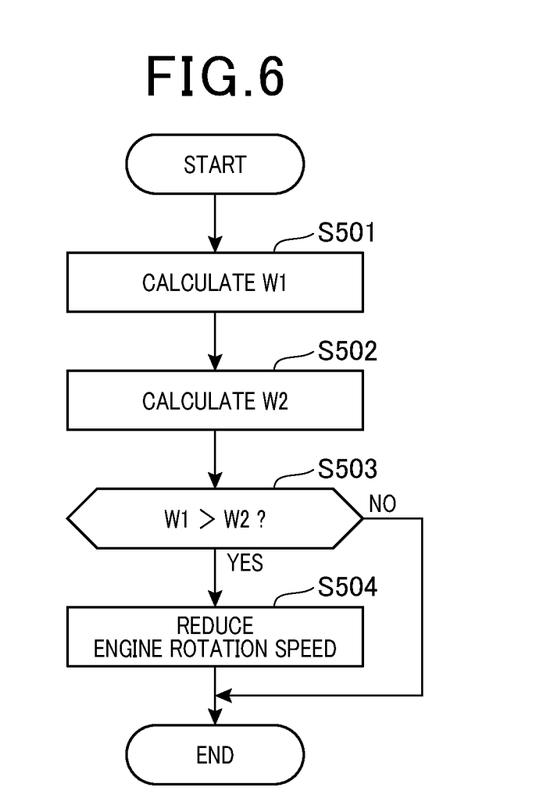
FIG. 6 is a flowchart of vehicle driving control according to another embodiment.

In FIG. 6, first, in step S501, the sum W1 of generated power, which is the total sum of the power generated by the rotating electric machines 112 and 122, is calculated, and then, in step S502, the sum W2 of consumed power, which is the total sum of the power consumed by the rotating electric machines 112 and 122, is calculated. Next, in step S503, it is determined whether the sum W1 of generated power exceeds the sum W2 of consumed power. When W1>W2, the process proceeds to step S504, in which the rotation speed of the engine 124 is reduced, the power generated in the rotating electric machine 122 is reduced, and the process ends. When W1≤W2, the process ends. According to the ECU 30, the power can be set not to be supplied from the rotating electric machines 112 and 122 to the battery 11 by controlling the rotation speed of the engine 124 and controlling W1 and W2 in such a manner that W1 does not exceed W2 through the processing shown in FIG. 6.

Although the processing of reducing the rotational speed of the engine 124 has been illustrated as the processing in step S504, the processing is not limited thereto. Any processing may be employed as long as it is processing of reducing W1 or increasing W2. Further, the ECU 30 may be configured to control the sum of power supplied from the power supply source (for example, rotating electric machine 122 and external power source 50) so as not to exceed the sum of consumed power in the entire driving system 110. Specifically, for example, a total sum of the power generated by the rotating electric machines 112 and 122 and the charge power from the external power source 50 is calculated as a sum W3 of supplied power. Further, a total sum of power consumed by the rotating electric machines 112 and 122, the converter 18, the low voltage loads 20 and 21, the external power source control device 25, and the like is calculated as a sum W4 of consumed power. Then, the configurations on the power supply side and the power consumption side may be controlled in such a manner that the sum W3 of supplied power does not exceed the sum W4 of consumed power.

According to the above embodiments, the following effects can be obtained.

The driving system 10, 110 includes: the battery 11 including a plurality of cells; the rotating electric machine 12, 112 that drives the vehicle by power supplied from the battery 11 and the like; and the ECU 30. The ECU 30 includes: the battery control unit 31 that control the battery 11; the rotating electric machine control unit 41 that controls the rotating electric machine 12, 112, 122; and the fail-safe running unit 40 that controls fail-safe running of the vehicle.

The battery control unit includes: the voltage detection unit 32 that acquires a voltage value of the battery 11 detected by the voltage detection circuit 16; the abnormality determination unit 37 that determines an abnormality in voltage detection system for each of the cells based on the cell voltage value VC; and the rank setting unit 38 that sets ranks of the plurality of cells based on a parameter involved in failure in the battery 11.

The fail-safe running unit 40 determines the mode of fail-safe running of the vehicle based on the rank of the cell to be detected by the voltage detection system determined to have an abnormality, and the rotating electric machine control unit 41 or the like controls the rotating electric machine 12, 112, 122 based on the mode of fail-safe running of the vehicle determined by the fail-safe running unit 40. The cell rank is set for each of the cells based on the parameter involved in a failure in the battery 11, and the mode of fail-safe running is determined based on the rank of the cell to be detected by the voltage detection system determined to have an abnormality. Therefore, it is possible to determine the mode of fail-safe running in consideration of the failure in the battery. As a result, when an abnormality occurs in the voltage detection system for a cell, it is possible to ensure the fail-safe running performance of the vehicle while avoiding a failure in the battery 11 such as overcharge and overdischarge.

For example, in a case where the rank setting unit 38 sets the cell rank so that a higher rank is given to a cell having a higher cell voltage value VC when it is determined by the abnormality determination unit 37 that there is no abnormality in voltage detection system, the fail-safe running unit 40 determines the overcharge prevention mode for preventing overcharging of the battery 11 as the mode of fail-safe running, when the rank of the cell is higher than the predetermined high-order threshold value XH (including a case where the rank of the cell is the same as that of the high-order threshold value XH). When the rank of the cell is lower than the predetermined low-order threshold value XL (including a case where the rank of the cell is the same as that of the predetermined low-order threshold value XL), the fail-safe running unit 40 determines, as the mode of fail-safe running, the overdischarge prevention mode for preventing overdischarging of the battery 11. In a case where a voltage detection system determined to have an abnormality exists, it is determined whether it is necessary to prevent overcharge or overdischarge based on comparison between the rank of the cell to be detected by the voltage detection system determined to have an abnormality and the high-order threshold value XH or the low-order threshold value XL without immediately performing the overcharge or overdischarge prevention control, and, only when it is determined that it is necessary to prevent overcharge or overdischarge, the control therefor can be performed. As a result, it is possible to ensure the fail-safe running performance of the vehicle while avoiding a failure in the battery 11 due to overcharge and overdischarge.

The battery control unit 31 repeatedly performs processing performed by the abnormality determination unit 37 and the rank setting unit 38 at a predetermined cycle. Through the processing in step S112 and the like shown in FIG. 2, the rank setting unit 38 sets the rank of each of the plurality of cells, except the cell to be detected by the voltage detection system determined to have an abnormality in a cycle previous to the current cycle, among the plurality of cells. Therefore, in the processing in step S113 and the like shown in FIG. 2, the ranks of the cells can be set based on the cell voltage values VC acquired in a state where there is no abnormality in the voltage detection system, and stored in the ECU 30. By periodically performing the series of processing shown in FIG. 2 to FIG. 4, even when an abnormality in the voltage detection system is determined for some cells of the battery 11, the remaining cells in which the voltage detection system is normal can perform fail-safe running continuously.

Although the present disclosure has been described in accordance with the examples, it is understood that the present disclosure is not limited to the examples and structures. The present disclosure also encompasses various modifications and variations within the range of equivalency. In addition, various combinations and configurations, and other combinations and configurations, including more, less or only a single element, also fall within the spirit and scope of the present disclosure.

What is claimed is:

1. A driving control device for controlling a driving system for a vehicle, the driving system comprising: a battery as an assembled battery having a plurality of cells; and a rotating electric machine that drives the vehicle by power supplied, the driving control device comprising:
a non-transitory memory storing one or more computer programs; and
a processor configured to execute the one or more computer programs to:
acquire a voltage value for each of the plurality of cells of the battery as a cell voltage value;
determine, for each of the plurality of cells, whether there is an abnormality in a voltage detection system for each cell of the plurality of cells based on the cell voltage value;
set a rank of each cell of the plurality of cells based on a parameter involved in failure in the battery;
determine a mode of fail-safe running of the vehicle based on the rank of a cell to be detected by the voltage detection system determined to have an abnormality; and
control the rotating electric machine based on the determined mode of fail-safe running of the vehicle.

2. The driving control device according to claim 1, wherein the processor is further configured to:
set the rank of each cell of the plurality of cells so that a higher rank is given to a cell having a higher cell voltage value when determined that there is no abnormality in the voltage detection system, and
when the rank of the cell is higher than a predetermined high-order threshold value, determine, as the mode of the fail-safe running, an overcharge prevention mode for preventing overcharging of the battery.

3. The driving control device according to claim 2, wherein the overcharge prevention mode is a mode for prohibiting charging of the battery.

4. The driving control device according to claim 2, wherein the overcharge prevention mode is a mode including prohibiting power generation by the rotating electric machine.

5. The driving control device according to claim 2, wherein
the driving system comprises a plurality of the rotating electric machines,
the plurality of rotating electric machines include at least one rotating electric machine capable of generating power, and
the overcharge prevention mode is a mode for prohibiting a sum of generated power, which is a total sum of the power generated by the plurality of rotating electric machines, from exceeding a sum of consumed power, which is a total sum of the power consumed by the plurality of rotating electric machines.

6. The driving control device according to claim 2, wherein
the driving system comprises an external power source controller that controls charging of the battery from an external power source connected to the vehicle,
the external power source controller is further configured to control charging of the battery from the external power source based on the determined mode of fail-safe running of the vehicle, and the overcharge prevention mode is a mode including prohibiting charging of the battery from the external power source.

7. The driving control device according to claim 1, wherein the processor is further configured to set the rank of each cell of the plurality of cells the cells so that a higher rank is given to a cell having a higher cell voltage value when determined that there is no abnormality in the voltage detection system, and when the rank of the cell is lower than a predetermined low-order threshold value, the processor is configured to determine, as the mode of fail-safe running, an overdischarge prevention mode for preventing overdischarging of the battery.

8. The driving control device according to claim 7, wherein the overdischarge prevention mode includes setting a lower limit of a state of charge that allows the battery to be discharged higher than that during non-fail-safe running of the vehicle.

9. The driving control device according to claim 7, wherein the overdischarge prevention mode includes making a driving force of the rotating electric machine to drive the vehicle lower than that during non-fail-safe running of the vehicle.

10. The driving control device according to claim 1, wherein the processor is configured to:

repeatedly perform the determining abnormality and the setting rank at a predetermined cycle, and set the rank of each cell of the plurality of cells, except a cell to be detected by the voltage detection system determined to have an abnormality in a cycle previous to the current cycle, among the plurality of cells.

11. A driving system for a vehicle, the driving system comprising: a battery as an assembled battery having a plurality of cells; a rotating electric machine that drives the vehicle by power supplied; and a control device comprising:

a non-transitory memory storing one or more computer programs; and a processor configured to execute the one or more computer programs to:

acquire a voltage value for each of the plurality of cells of the battery as a cell voltage value;

determine, for each of the plurality of cells, whether there is an abnormality in a voltage detection system for each cell of the plurality of cells based on the cell voltage value;

set a rank of each cell of the plurality of cells based on parameters involved in failure in the battery;

determine a mode of fail-safe running of the vehicle based on the rank of a cell to be detected by the voltage detection system determined to have an abnormality; and control the rotating electric machine based on the determined mode of fail-safe running of the vehicle.

* * * * *